US012770476B2

(12) United States Patent
Nada et al.

(10) Patent No.: US 12,770,476 B2
(45) Date of Patent: Oct. 20, 2026

(54) MONEY HANDLING SYSTEM

(71) Applicant: Glory Ltd., Himeji (JP)

(72) Inventors: Keisuke Nada, Himeji (JP); Shimpei Nishida, Himeji (JP); Yuya Kataoka, Himeji (JP); Hayato Matono, Himeji (JP); Tomoaki Nakayama, Himeji (JP); Yusuke Yokota, Himeji (JP); Shogo Tsuda, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/926,328

(22) Filed: Oct. 25, 2024

(65) Prior Publication Data

US 2025/0140080 A1 May 1, 2025

(30) Foreign Application Priority Data

Oct. 27, 2023 (JP) ................................ 2023-184683

(51) Int. Cl.
*G07F 19/00* (2006.01)
*G06Q 20/10* (2012.01)
(Continued)

(52) U.S. Cl.
CPC ....... *G07F 19/206* (2013.01); *G06Q 20/1085* (2013.01); *G07D 11/13* (2019.01);
(Continued)

(58) Field of Classification Search
CPC .... G07F 19/206; G07D 11/245; G07D 11/13; G07D 11/125; G07D 2201/00; G06Q 20/1085
(Continued)

(56) References Cited

U.S. PATENT DOCUMENTS

2010/0131407 A1* 5/2010 Folk ................. G06Q 10/08355 705/39
2013/0232064 A1* 9/2013 Bosch ................ G06Q 20/1085 235/379
(Continued)

FOREIGN PATENT DOCUMENTS

JP 5786694 B2 9/2015
JP 2021157327 A * 10/2021 ............. G07D 11/24
WO 2021/192375 A1 9/2021

*Primary Examiner* — Ambreen A. Alladin
(74) *Attorney, Agent, or Firm* — XSENSUS LLP

(57) ABSTRACT

The money handling system includes: a money handling device that is installed in a property accommodating first and second financial institutions and that is configured to perform a first money handling process for a transaction of the first financial institution and a second money handling process for a transaction of the second financial institution; and a computer configured to manage information about the money stored in the money handling device, and configured to distinguish, as the management, between money belonging to the first financial institution and money belonging to the second financial institution, wherein the computer updates the information about the money of the first financial institution in a case where the money handling device performs the first money handling process, and updates the information about the money of the second financial institution in a case where the money handling device performs the second money handling process.

16 Claims, 12 Drawing Sheets

(51) Int. Cl.
*G07D 11/13* (2019.01)
*G07D 11/245* (2019.01)
*G07D 11/125* (2019.01)

(52) U.S. Cl.
CPC ......... *G07D 11/245* (2019.01); *G07D 11/125* (2019.01); *G07D 2201/00* (2013.01); *G07D 2211/00* (2013.01)

(58) Field of Classification Search
USPC ............................................................ 705/43
See application file for complete search history.

(56) References Cited

U.S. PATENT DOCUMENTS

| | | | | |
|---|---|---|---|---|
| 2014/0069769 | A1 | 3/2014 | Kobayashi et al. | |
| 2014/0129439 | A1* | 5/2014 | Suisa | G06Q 40/02 705/42 |
| 2014/0216888 | A1 | 8/2014 | Horigome | |
| 2014/0339301 | A1* | 11/2014 | Angus | G06Q 40/04 235/379 |
| 2015/0146963 | A1 | 5/2015 | Klein et al. | |
| 2022/0012973 | A1* | 1/2022 | Shimakata | G07D 11/18 |

* cited by examiner

FIG.5

51

FIRST STORAGE

| | DENOMINATION | SERIAL NUMBER | IMAGE DATA | FINANCIAL INSTITUTION |
|---|---|---|---|---|
| 1 | EUR 5 | XZ1238 | ******1 | BANK A |
| 2 | EUR 5 | KJ3847 | ******2 | BANK A |
| 3 | EUR 5 | RH9584 | ******3 | BANK B |
| ⋮ | ⋮ | ⋮ | ⋮ | ⋮ |

SECOND STORAGE

| | DENOMINATION | SERIAL NUMBER | IMAGE DATA | FINANCIAL INSTITUTION |
|---|---|---|---|---|
| 1 | EUR 10 | WS9848 | *****11 | BANK B |
| 2 | EUR 10 | FJ4985 | *****12 | BANK A |
| 3 | EUR 10 | SI0958 | *****13 | BANK B |
| ⋮ | ⋮ | ⋮ | ⋮ | ⋮ |

THIRD STORAGE

| | DENOMINATION | SERIAL NUMBER | IMAGE DATA | FINANCIAL INSTITUTION |
|---|---|---|---|---|
| 1 | EUR 20 | XU0918 | *****21 | BANK B |
| 2 | EUR 20 | JU4758 | *****22 | BANK A |
| 3 | EUR 20 | JH9850 | *****23 | BANK A |
| ⋮ | ⋮ | ⋮ | ⋮ | ⋮ |

COLLECTION CASSETTE

| | DENOMINATION | SERIAL NUMBER | IMAGE DATA | FINANCIAL INSTITUTION |
|---|---|---|---|---|
| 1 | EUR 20 | KL3498 | *****31 | BANK B |
| 2 | EUR 10 | TG9548 | *****32 | BANK B |
| 3 | EUR 50 | JD4520 | *****33 | BANK A |
| ⋮ | ⋮ | ⋮ | ⋮ | ⋮ |

FIG.6

601

| | DENOMINATION | BANK A | BANK B |
|---|---|---|---|
| FIRST STORAGE | EUR 5 | 420 | 80 |
| SECOND STORAGE | EUR 10 | 150 | 150 |
| THIRD STORAGE | EUR 20 | 250 | 450 |
| COLLECTION CASSETTE | EUR 5 | 20 | 80 |
| | EUR 10 | 50 | 50 |
| | EUR 20 | 80 | 20 |
| | EUR 50 | 150 | 250 |

DEPOSIT TRANSACTION AT BANK A
EUR 5×20, EUR 10×10

602

| | DENOMINATION | BANK A | BANK B |
|---|---|---|---|
| FIRST STORAGE | EUR 5 | 438 (+18) | 80 |
| SECOND STORAGE | EUR 10 | 160 (+10) | 150 |
| THIRD STORAGE | EUR 20 | 250 | 450 |
| COLLECTION CASSETTE | EUR 5 | 22 (+2) | 80 |
| | EUR 10 | 50 | 50 |
| | EUR 20 | 80 | 20 |
| | EUR 50 | 150 | 250 |

FIG.7

701

| | DENOMINATION | BANK A | BANK B |
|---|---|---|---|
| FIRST STORAGE | EUR 5 | 438 | 80 |
| SECOND STORAGE | EUR 10 | 160 | 150 |
| THIRD STORAGE | EUR 20 | 250 | 450 |
| COLLECTION CASSETTE | EUR 5 | 22 | 80 |
| | EUR 10 | 50 | 50 |
| | EUR 20 | 80 | 20 |
| | EUR 50 | 150 | 250 |

DISPENSE TRANSACTION AT BANK B
EUR 5 × 100

702

| | DENOMINATION | BANK A | BANK B |
|---|---|---|---|
| FIRST STORAGE | EUR 5 | 438 | −21 (−101) |
| SECOND STORAGE | EUR 10 | 160 | 150 |
| THIRD STORAGE | EUR 20 | 250 | 450 |
| COLLECTION CASSETTE | EUR 5 | 22 | 81 (+1) |
| | EUR 10 | 50 | 50 |
| | EUR 20 | 80 | 20 |
| | EUR 50 | 150 | 250 |

FIG.8

801

| | DENOMINATION | BANK A | BANK B |
|---|---|---|---|
| FIRST STORAGE | EUR 5 | 438 | -21 |
| SECOND STORAGE | EUR 10 | 160 | 150 |
| THIRD STORAGE | EUR 20 | 250 | 450 |
| COLLECTION CASSETTE | EUR 5 | 22 | 81 |
| | EUR 10 | 50 | 50 |
| | EUR 20 | 80 | 20 |
| | EUR 50 | 150 | 250 |

COLLECTION PROCESS FOR BANK A AND BANK B

802

| | DENOMINATION | BANK A | BANK B |
|---|---|---|---|
| FIRST STORAGE | EUR 5 | 400 (-38) | -21 |
| SECOND STORAGE | EUR 10 | 160 | 150 |
| THIRD STORAGE | EUR 20 | 250 | 300 (-150) |
| COLLECTION CASSETTE | EUR 5 | 0 (-22) | 0 (-81) |
| | EUR 10 | 0 (-50) | 0 (-50) |
| | EUR 20 | 0 (-80) | 0 (-20) |
| | EUR 50 | 0 (-150) | 0 (-250) |

901

| | DENOMINATION | BANK A | BANK B |
|---|---|---|---|
| FIRST STORAGE | EUR 5 | 400 | -21 |
| SECOND STORAGE | EUR 10 | 160 | 150 |
| THIRD STORAGE | EUR 20 | 250 | 300 |
| COLLECTION CASSETTE | EUR 5 | 0 | 0 |
| | EUR 10 | 0 | 0 |
| | EUR 20 | 0 | 0 |
| | EUR 50 | 0 | 0 |

REPLENISHMENT PROCESS
FOR BANK A AND BANK B

902

| | DENOMINATION | BANK A | BANK B |
|---|---|---|---|
| FIRST STORAGE | EUR 5 | 400 | 300 (+321) |
| SECOND STORAGE | EUR 10 | 250 (+90) | 300 (+150) |
| THIRD STORAGE | EUR 20 | 250 | 300 |
| COLLECTION CASSETTE | EUR 5 | 0 | 0 |
| | EUR 10 | 0 | 0 |
| | EUR 20 | 0 | 0 |
| | EUR 50 | 0 | 0 |

FIG.10

1001

| | DENOMINATION | BANK A | BANK B |
|---|---|---|---|
| FIRST STORAGE | EUR 5 | 438 | −21 |
| SECOND STORAGE | EUR 10 | 160 | 150 |
| THIRD STORAGE | EUR 20 | 250 | 450 |
| COLLECTION CASSETTE | EUR 5 | 22 | 81 |
| | EUR 10 | 50 | 50 |
| | EUR 20 | 80 | 20 |
| | EUR 50 | 150 | 250 |

COLLECTION/REPLENISHMENT PROCESS FOR BANK A AND BANK B

1002

| | DENOMINATION | BANK A | BANK B |
|---|---|---|---|
| FIRST STORAGE | EUR 5 | 400 (−38) | 300 (+321) |
| SECOND STORAGE | EUR 10 | 250 (+90) | 300 (+150) |
| THIRD STORAGE | EUR 20 | 250 | 300 (−150) |
| COLLECTION CASSETTE | EUR 5 | 0 (−22) | 0 (−81) |
| | EUR 10 | 0 (−50) | 0 (−50) |
| | EUR 20 | 0 (−80) | 0 (−20) |
| | EUR 50 | 0 (−150) | 0 (−250) |

FIG.11

1101

| | DENOMINATION | BANK A | BANK B |
|---|---|---|---|
| FIRST STORAGE | EUR 5 | 438 | −21 |
| SECOND STORAGE | EUR 10 | 160 | 150 |
| THIRD STORAGE | EUR 20 | 250 | 450 |
| COLLECTION CASSETTE | EUR 5 | 22 | 81 |
| | EUR 10 | 50 | 50 |
| | EUR 20 | 80 | 20 |
| | EUR 50 | 150 | 250 |

MONEY CHANGE PROCESS BETWEEN BANK A AND BANK B

1102

| | DENOMINATION | BANK A | BANK B |
|---|---|---|---|
| FIRST STORAGE | EUR 5 | 200 (−238) | 217 (+238) |
| SECOND STORAGE | EUR 10 | 160 | 150 |
| THIRD STORAGE | EUR 20 | 300 (+50) | 400 (−50) |
| COLLECTION CASSETTE | EUR 5 | 60 (+38) | 43 (−38) |
| | EUR 10 | 50 | 50 |
| | EUR 20 | 80 | 20 |
| | EUR 50 | 150 | 250 |

MONEY HANDLING SYSTEM

CROSS-REFERENCE TO RELATED APPLICATION

This application claims priority to Japanese Patent Application No. 2023-184683 filed on Oct. 27, 2023, the entire disclosure of which is incorporated herein by reference.

BACKGROUND

A conventional banknote handling device is installed in a counter of a building of a financial institution. A teller at a first reception and a teller at a second reception share a single banknote handling device. The banknote handling device performs a depositing transaction or a dispensing transaction according to an instruction from any one of the two tellers.

A conventional an automatic teller machine (ATM) can perform transactions for each of a plurality of financial institutions. Specifically, the ATM performs transactions for each of the plurality of financial institutions by virtually activating software for each of them.

In the conventional ATM described above, money stored in the ATM is managed by a representative financial institution. Financial institutions other than the representative financial institution borrow funds from the representative financial institution and perform transactions using the ATM. The representative financial institution and the other financial institutions conduct fund settlement separately from the relevant ATM.

SUMMARY

The present disclosure relates to a money handling system. The money handling system includes: a money handling device that is installed in a property accommodating a first financial institution and a second financial institution and that is configured to perform a money handling process involving taking money in or feeding out money stored, where the money handling process includes a first money handling process for a transaction of the first financial institution and a second money handling process for a transaction of the second financial institution; and a computer configured to manage information about the money processed by the money handling device, and configured to distinguish, as the management, between money belonging to the first financial institution and money belonging to the second financial institution, wherein the computer updates the information about the money of the first financial institution in a case where the money handling device performs the first money handling process, and updates the information about the money of the second financial institution in a case where the money handling device performs the second money handling process.

Figure 4:
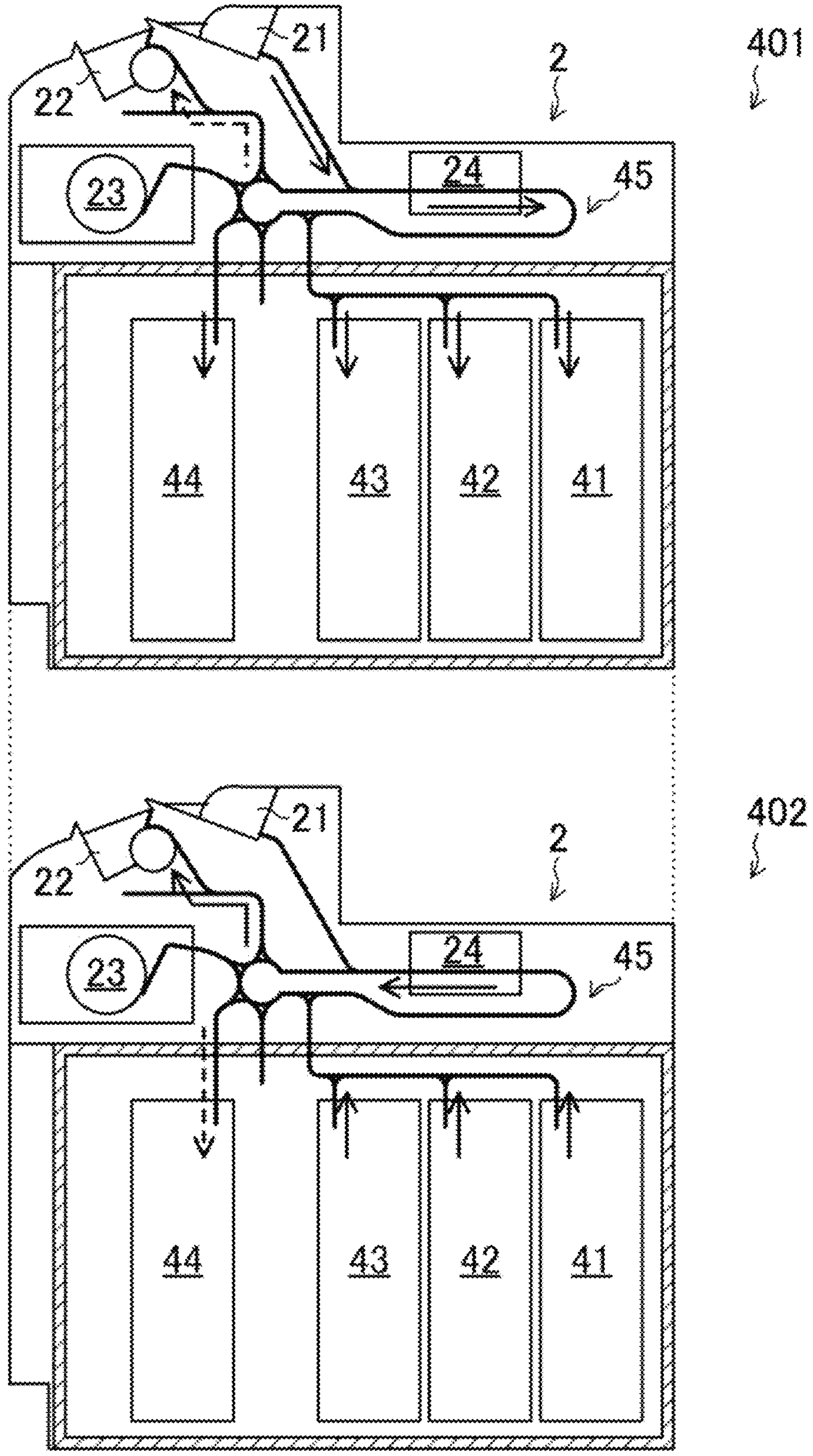

An upper drawing of FIG. 4 illustrates a banknote transport path of the banknote handling device at a time of a depositing transaction, and a lower drawing of FIG. 4 illustrates a banknote transport path of the banknote handling device at a time of a dispensing transaction.

FIG. 5 illustrates a management image of information about banknotes stored in each storage of the banknote handling device.

FIG. 6 illustrates a management image of information about banknotes before and after the banknote handling device performs a depositing transaction.

FIG. 7 illustrates a management image of information about banknotes before and after the banknote handling device performs a dispensing transaction.

FIG. 8 illustrates a management image of information about banknotes before and after the banknote handling device performs a collection process.

Figure 9:
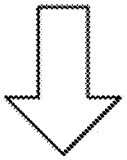

FIG. 9 illustrates a management image of information about banknotes before and after the banknote handling device performs a replenishment process.

FIG. 10 illustrates a management image of information about banknotes before and after the banknote handling device performs a collection/replenishment process.

FIG. 11 illustrates a management image of information about banknotes before and after the banknote handling device performs a money change process among a plurality of financial institutions.

Figure 12:
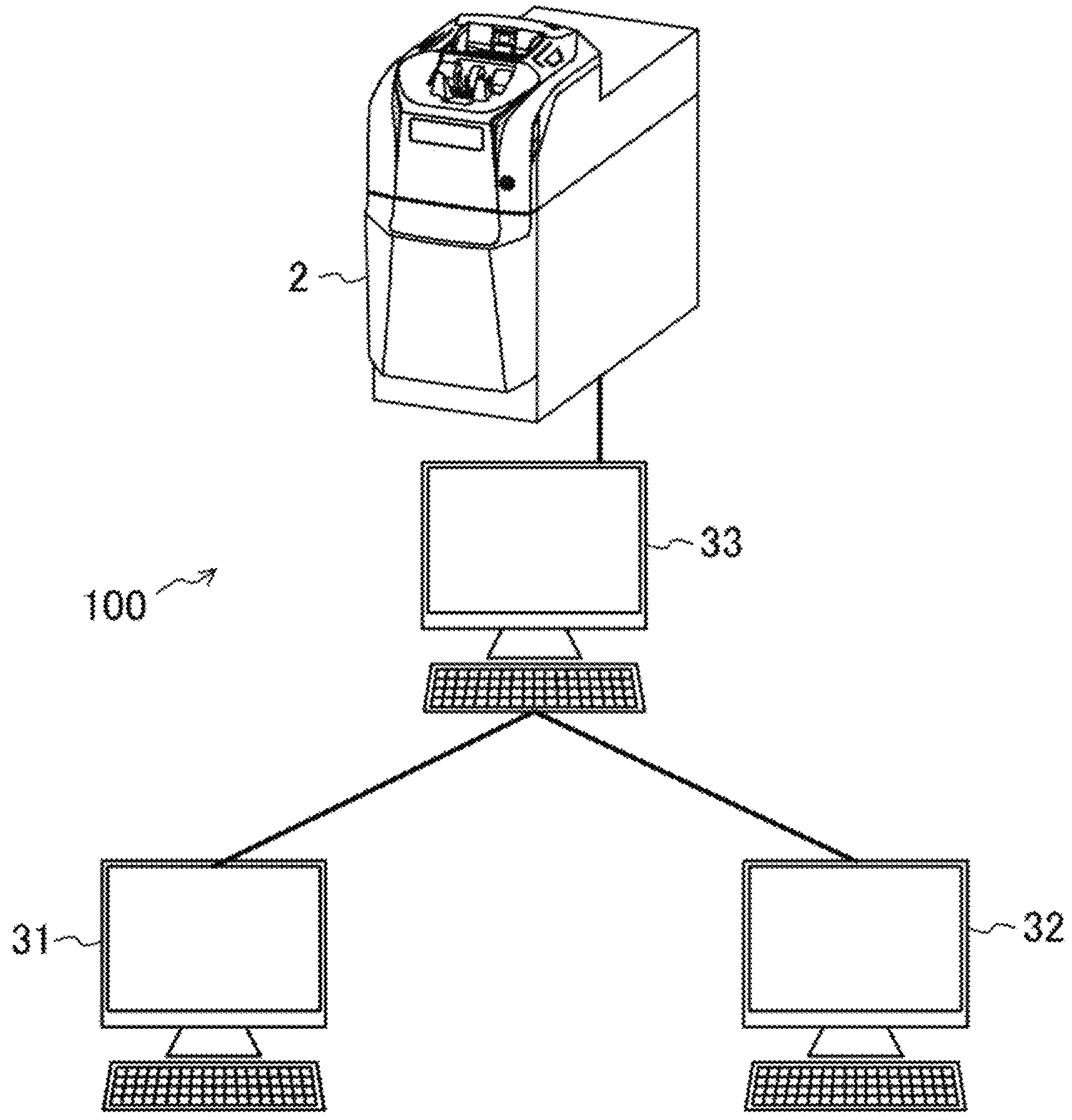

FIG. 12 illustrates a variation of the money handling system.

DETAILED DESCRIPTION OF THE DRAWINGS

In terms of business efficiency, financial institutions have adopted a property-sharing management system in which a plurality of financial institutions share a single property and each of the plurality of financial institutions being accommodated in the property provides services to their own customers. If a single money handling device installed in a shared property performs transactions for each of the plurality of financial institutions, the business efficiency of the financial institution can be further improved.

However, when the plurality of financial institutions shares a single money handling device installed in a shared property, management of money stored in the money handling device is problematic.

The technique disclosed herein enables effective management of money stored in a money handling device used by each of the plurality of financial institutions.

The present disclosure relates to a money handling system. The money handling system includes: a money handling device that is installed in a property accommodating a first financial institution and a second financial institution and that is configured to perform a money handling process involving taking money in or feeding out money stored, where the money handling process includes a first money handling process for a transaction of the first financial institution and a second money handling process for a transaction of the second financial institution; and a computer configured to manage information about the money processed by the money handling device, and configured to distinguish, as the management, between money belonging to the first financial institution and money belonging to the second financial institution, wherein the computer updates the information about the money of the first financial institution in a case where the money handling device performs the first money handling process, and updates the information about the money of the second financial institution in a case where the money handling device performs the second money handling process.

The money handling device is installed in a property. The property accommodates a first financial institution and a second financial institution. The property may be a financial institution building. The Property may be a structure like a building in which more than two tenants (like banks) accommodate. The property is, for example, a shared property of the first financial institution and the second financial institution. The money handling device performs the first money handling process for a transaction of the first financial institution and the second money handling process for a transaction of the second financial institution. The money handling process involves taking money in or feeding out money stored. The money handling device stores money.

The computer manages information about the money stored in the money handling device. The computer manages the money stored in the money handling device by distinguishing money belonging to the first financial institution and money belonging to the second financial institution.

The computer updates the information about the money of the first financial institution if the money handling device performs the first money handling process. The computer updates the information about the money of the second financial institution if the money handling device performs the second money handling process. The computer can effectively manage the money stored in the money handling device. The money handling system does not need fund settlement among the plurality of financial institutions whereas a conventional ATM does.

The money handling device may include a first storage configured to store banknotes or coins of a first denomination for the first financial institution and banknotes or coins of the first denomination for the second financial institution, banknotes and coins being money and the computer may manage the number of banknotes or coins of each denomination stored in the first storage, the banknotes or the coins belonging to the first financial institution, and the number of banknotes or coins of each denomination stored in the first storage, the banknotes or the coins belonging to the second financial institution.

The money handling device does not store banknotes or coins of the first financial institution and banknotes or coins of the second financial institution in different storages. The money handling device stores banknotes or coins of the first denomination for the first financial institution and banknotes or coins of the first denomination for the second financial institution together in a single storage. The storage efficiency of the money handling device can be improved. In other words, the money handling device can store a large number of banknotes or coins without being upsized.

The money handling device may include a second storage storing banknotes or coins of a second denomination for the first financial institution and banknotes or coins of the second denomination for the second financial institution, and the computer may manage the number of banknotes or coins of each denomination stored in the first storage and the second storage, the banknotes or the coins belonging to the first financial institution and the number of banknotes or coins of each denomination stored in the first storage and the second storage, the banknotes or the coins belonging to the second financial institution.

The computer manages the number of banknotes or coins of each denomination stored in the first storage and the second storage and belonging to the first financial institution and the number of banknotes or coins of each denomination stored in the first storage and the second storage and belonging to the second financial institution. The computer can effectively manage banknotes or coins stored in the money handling device.

The money handling system further includes: a first operating computer configured to output execution of the first money handling process to the money handling device; and a second operating computer configured to output execution of the second money handling process to the money handling device, wherein the computer updates the information about the money of the first financial institution in a case where the money handling device performs the money handling process based on the output of the first operating computer, and updates the information about the money of the second financial institution in a case where the money handling device performs the money handling process based on the output of the second operating computer.

The money handling device including the operating computer consisting of the first operating computer and the second operating computer separately can clearly distinguish the first money handling process related to transactions of the first financial institution and the second money handling process related to transactions of the second financial institution. The computer can effectively manage the information about the money of the first financial institution and the information about the money of the second financial institution.

At least one of the first operating computer or the second operating computer may be a tablet computer.

The money handling device may perform at least one of a collection process of collecting the money stored from the money handling device, where a first collection process of the money of the first financial institution and a second collection process of the money of the second financial institution are performed together, and a replenishment process of replenishing the money handling device with money, where a first replenishment process for the money of the first financial institution and a second replenishment process for the money of the second financial institution are performed together.

Performing the first collection process and the second collection process together enables reduction in a cost for the collection process through Cash-in-Transit (CIT). Performing the first replenishment process and the second replenishment process together enables reduction in a cost for the replenishment process through CIT.

The computer may send a request to perform the collection process including the first collection process and the second collection process to a computer outside the system.

The computer outside the system may be, for example, a CIT computer.

The computer may calculate a cost for the collection process based on information about the denomination and number of banknotes or coins to be collected, the banknotes or the coins belonging to the first financial institution and information about the denomination and numbers of banknotes or coins to be collected, the banknotes or the coins belonging to the second financial institution.

The cost for the collection process through CIT may be determined based on the collection quantity and/or the collection amount of money. The computer may calculate the cost according to the collection quantity and collection amount of the money belonging to the first financial institution and the collection quantity and collection amount of the money belonging to the second financial institution. If the collection quantity and collection amount of the money belonging to the first financial institution and the collection quantity and collection amount of the money belonging to the second financial institution are calculated, the ratio of the cost that the first financial institution has to pay for the collection process and the ratio of the cost that the second financial institution has to pay for the collection process can be determined.

The computer may send a request to perform the replenishment process including the first replenishment process and the second replenishment process to a computer outside the system.

The computer may calculate a cost for the replenishment process based on information about the denomination and number of banknotes or coins for replenishment of the first financial institution and information about the denomination and number of banknotes or coins for replenishment of the second financial institution.

The computer can determine the ratio of the cost that the first financial institution has to pay for the replenishment process and the ratio of the cost that the second financial institution has to pay for the replenishment process.

The computer may send a request to perform the collection process including the first collection process and the second collection process and the replenishment process including the first replenishment process and the second replenishment process to a computer outside the system.

The CIT can perform the collection process and the replenishment process together. The costs for the collection process and the replenishment process can be further reduced.

The money handling device may include a sensor for obtaining information about a denomination of money.

By obtaining the information about a denomination of money, the computer can effectively manage the information about the money stored in the money handling device.

The money handling device may perform a process for banknotes, and the money handling device may include a sensor for obtaining identification information about banknotes.

By obtaining the identification information about banknotes, the computer can more effectively manage the banknotes stored in the money handling device. Here, the identification information about banknotes may be, for example, serial numbers of the banknotes.

In a case where an error occurs during a process by the money handling device, the computer may output information about a denomination, an identification number, and a financial institution of a banknote related to the error.

The error may be a transport error such as banknote jam. If a jammed banknote is removed from the transport path of the money handling device in order to clear the error, the banknote can be effectively managed based on information about the denomination, the identification number, and the financial institution of the banknote output by the computer.

The computer may be incorporated in the money handling device.

The computer may be a tablet computer.

The money handling device may further perform a third money handling process related to a transaction of a third financial institution being accommodated in the property, the money handling system may further include a third operating computer configured to output execution of the third money handling process to the money handling device, and the computer may update information about money of the third financial institution if the money handling device performs the money handling process based on the output of the third operating computer.

The money handling system can effectively manage the money stored in the money handling device even when a single money handling device is shared by three financial institutions.

The money handling system may further include a second money handling device configured to perform the first money handling process and the second money handling process.

The money handling system can effectively manage the money stored in each of the first money handling device and the second money handling device even when including two money handling devices: the first money handling device and the second money handling device.

An embodiment of a money handling system will be described below with reference to the drawings. The money handling system described herein are exemplary.

(Overall Configuration of Money Handling System)

Figure 1:
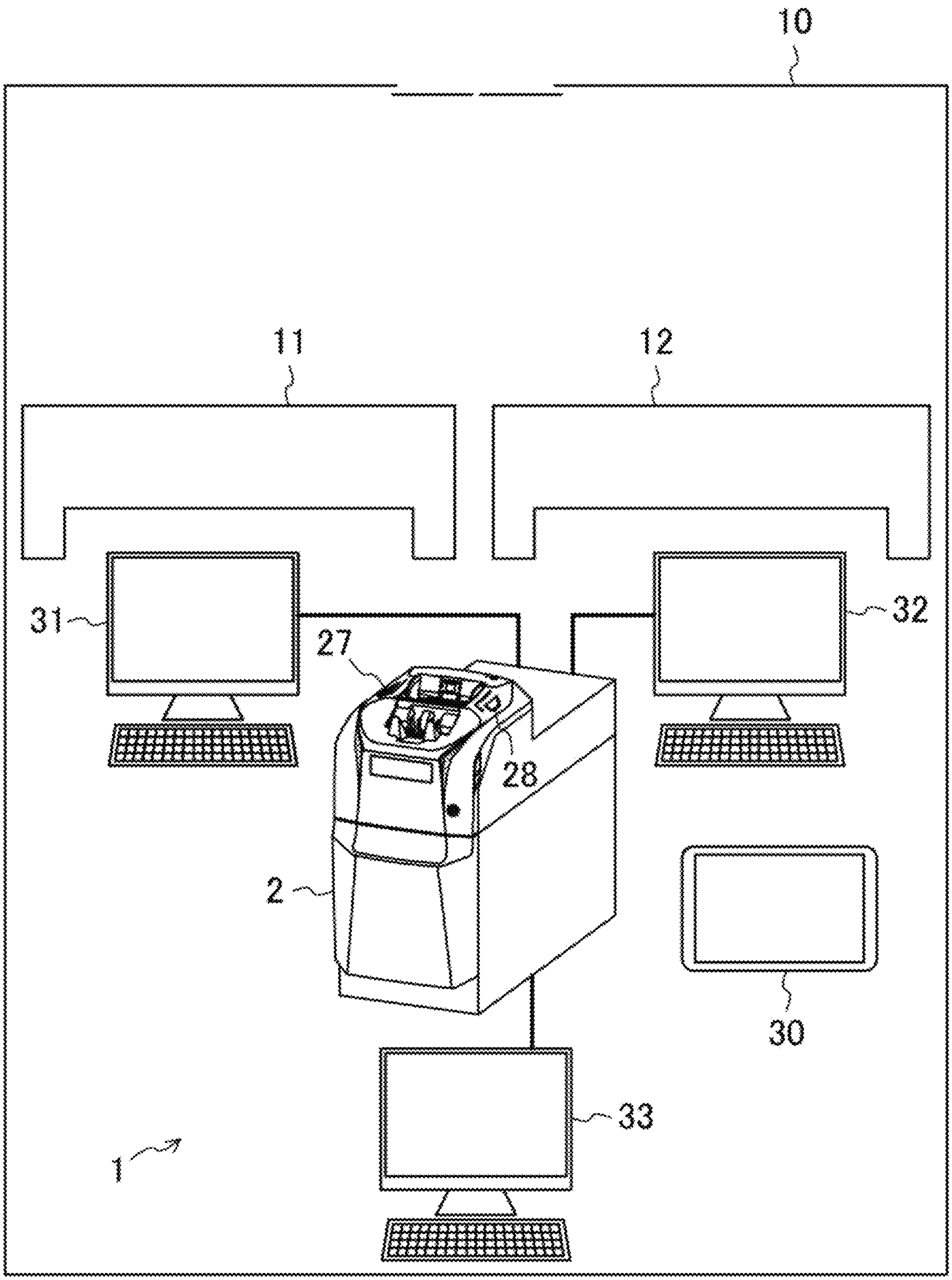
FIG. 1 illustrates a money handling system.
Figure 2:
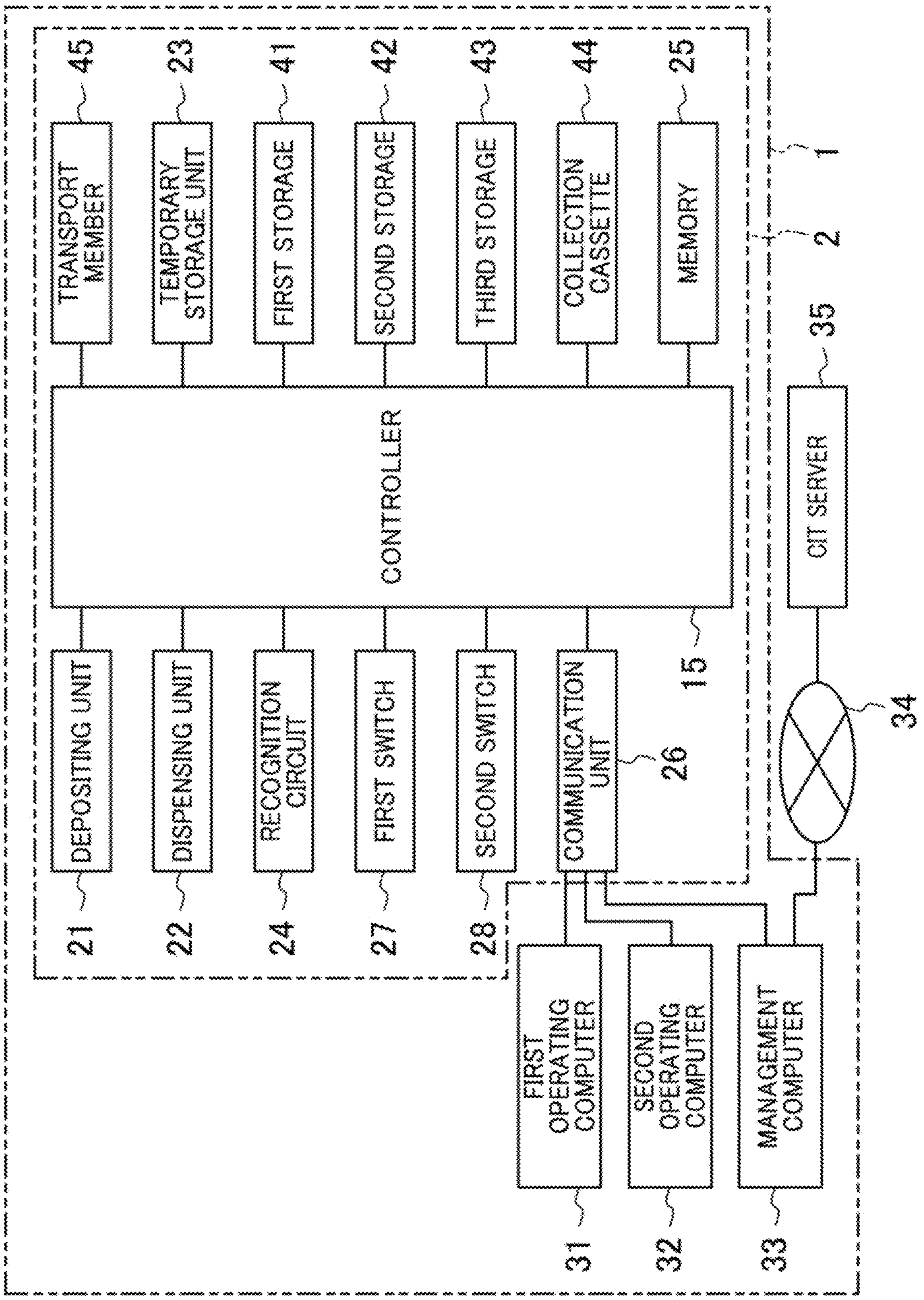
FIG. 2 is a block diagram of the money handling system.

FIG. 1 illustrates a money handling system 1. FIG. 2 is a block diagram of the money handling system 1. The money handling system 1 is installed in a building 10 of a financial institution. The building 10 is an example of property. The financial institution is, for example, a bank. The financial institution is not limited to a bank. A plurality of banks share the building 10. The plurality of banks is accommodated in the building 10. In the example of FIG. 1, a bank A as a first financial institution and a bank B as a second financial institution are accommodated in the building 10. A first counter 11 of the bank A and a second counter 12 of the bank B are installed in the building 10. Customers of the bank A conduct transactions of the bank A through tellers at the first counter 11, and customers of the bank B conduct transactions of the bank B through tellers at the second counter 12.

The money handling system 1 includes a money handling device. In the example of FIG. 1, the money handling device is a banknote handling device 2. The banknote handling device 2 is a so-called teller machine used by tellers and handles banknotes related to transactions. The money handling device of the money handling system 1 may be a money handling device that handles banknotes and coins. The money handling device may be a so-called cashier machine. The configuration of the banknote handling device 2 will be described later.

The money handling system 1 includes one banknote handling device 2. A teller of the bank A uses the banknote handling device 2 to conduct transactions of the bank A. A teller of the bank B also uses the banknote handling device 2 to conduct transactions of the bank B. The banknote handling device 2 is used by both the bank A and the bank B.

The money handling system 1 includes a first operating computer 31 and a second operating computer 32. The first operating computer 31 is installed at the first counter 11. The second operating computer 32 is installed at the second counter 12. The first operating computer 31 includes, for example, a calculation circuit, a display, a keyboard, and a memory device. The memory device is, for example, a nonvolatile semiconductor memory or a hard disk drive. Similarly to the first operating computer 31, the second operating computer 32 also includes a calculation circuit, a display, a keyboard, and a memory device.

Each of the first operating computer 31 and the second operating computer 32 is connected to the banknote handling device 2. The teller operates the first operating computer 31 in order to instruct the banknote handling device 2 to perform a banknote handling process associated with transactions of the bank A. The first operating computer 31 sends an occupancy command to the banknote handling device 2. Sending of the occupancy command allows the teller of the bank A to occupy the banknote handling device 2. The teller operates the second operating computer 32 in order to instruct the banknote handling device 2 to perform a banknote handling process associated with transactions of the bank B. The second operating computer 32 also sends an occupancy command to the banknote handling device 2. Sending of the occupancy command allows the teller of the bank B to occupy the banknote handling device 2.

The first operating computer 31 and/or the second operating computer 32 may be a tablet computer 30. The tablet computer 30 is connected to the banknote handling device 2 and has substantially the same functions as those of the first operating computer 31 and/or the second operating computer 32.

The money handling system 1 includes a management computer 33. The management computer 33 is connected to the banknote handling device 2. The management computer 33 includes, for example, a calculation circuit, a display, a keyboard, and a memory device. The management computer 33 manages the banknotes stored in the banknote handling device 2. The management computer 33 is also connected via the internet 34 to a CIT server 35 located outside the money handling system 1. As described later, the teller of the bank A or the bank B operates the management computer 33 in order to request the CIT server 35 to execute a collection process and/or a replenishment process of the banknote handling device 2. The CIT server 35 is an example of a computer located outside the system.

The management computer 33 may be the tablet computer 30. The tablet computer 30 is connected to the banknote handling device 2 and the internet 34, and has substantially the same functions as those of the management computer 33.

(Banknote Handling Device)

Figure 3:
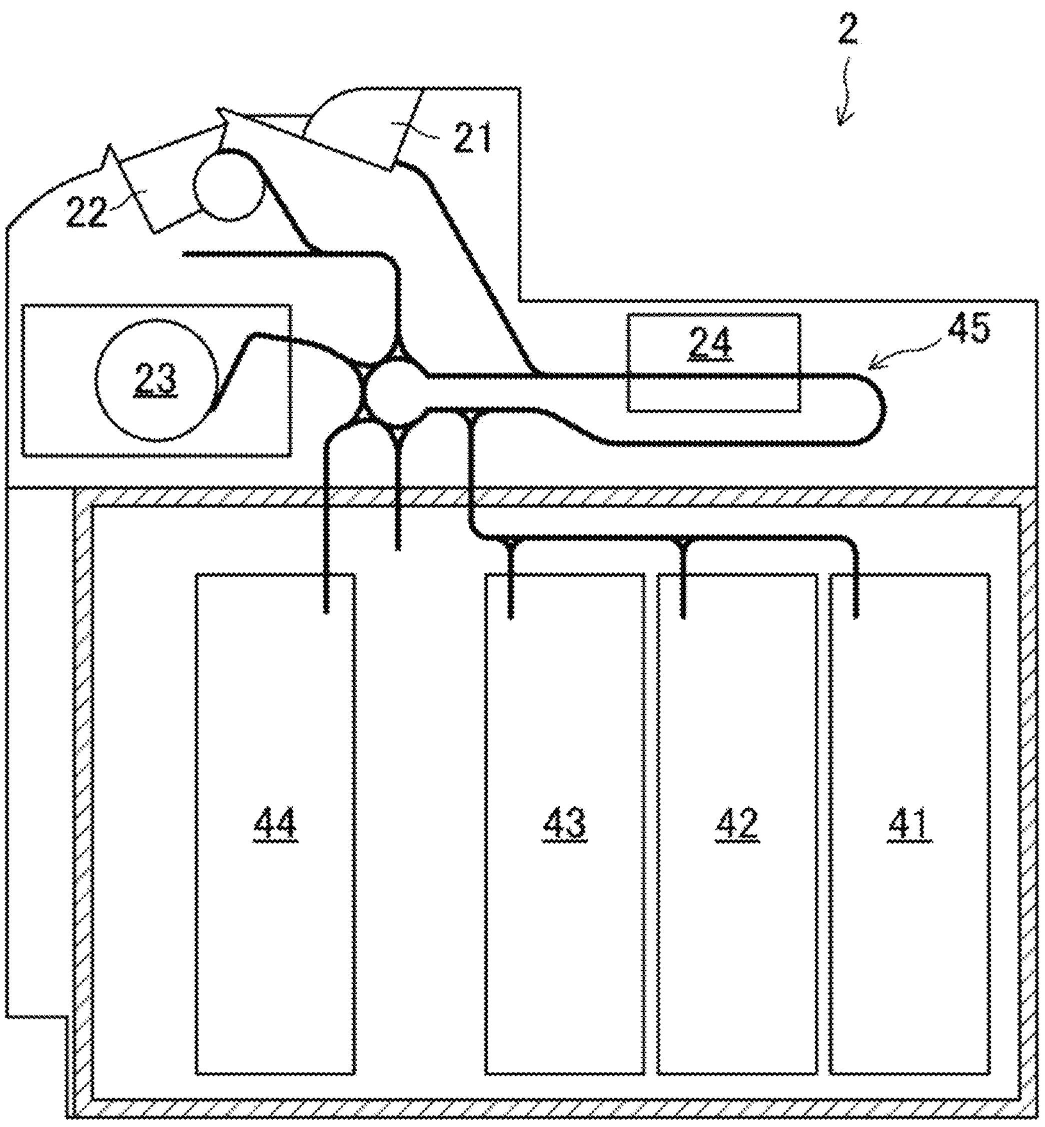
FIG. 3 illustrates a configuration of a banknote handling device.

FIG. 3 illustrates the configuration of the banknote handling device 2. The banknote handling device 2 of FIG. 3 is an example. As described above, the banknote handling device 2 performs banknote handling processes associated with bank transactions. The bank transactions include depositing transactions. The depositing transaction is a transaction of depositing money into a customer's account. In association with the depositing transaction, the banknote handling device 2 performs a process of taking and storing a banknote into the device. The bank transactions include dispensing transactions. The dispensing transaction is a transaction of withdrawing money from a customer's account. In association with the dispensing transaction, the banknote handling device 2 performs a process of dispensing the banknotes stored in the device to the outside of the device.

The banknote handling device 2 includes a depositing unit 21. The depositing unit 21 takes, into the device, the banknotes inserted into depositing unit 21 by tellers.

The banknote handling device 2 includes a dispensing unit 22. The dispensing unit 22 dispenses banknotes to the outside of the device. The teller can take out the banknotes dispensed to the dispensing unit 22. The banknote handling device 2 may include two or more dispensing units.

The banknote handling device 2 includes a temporary storage unit 23. The temporary storage unit 23 stores banknotes and feeds out the stored banknotes.

The banknote handling device 2 includes a recognition circuit 24. The recognition circuit 24 recognizes the banknote to be taken into the device or dispensed outside the device. The recognition circuit 24 recognizes the banknote to obtain information such as the currency, the denomination, the serial number, the authenticity, and the fitness. The recognition circuit 24 also obtains an image of the banknote. The recognition circuit 24 is an example of a sensor.

The banknote handling device 2 includes at least one storage. The banknote handling device 2 in the illustrated example includes a plurality of storages 41, 42, 43. The first storage 41, the second storage 42, and the third storage 43 store banknotes by denomination. The first storage 41, the second storage 42, and the third storage 43 also feed out banknotes. The first storage 41, the second storage 42, and the third storage 43 store banknotes that the banknote handling device 2 can dispense at a time of a dispensing transaction. The banknotes stored in the first storage 41, the second storage 42, and the third storage 43 are fit notes. The number of storages in the banknote handling device 2 is not limited to three.

The banknote handling device 2 includes a collection cassette 44. The collection cassette 44 stores banknotes. Basically, the collection cassette 44 does not feed out banknotes. The collection cassette 44 stores banknotes that are not stored in the first storage 41, the second storage 42, and the third storage 43. The collection cassette 44 stores, for example, unfit notes. The collection cassette 44 also stores banknotes collected from the banknote handling device 2. The collection cassette 44 can be removed from the banknote handling device 2. As described later, banknotes may be collected from the banknote handling device 2 by removing the collection cassette 44 from the banknote handling device 2 at a time of the collection process of the banknote handling device 2. When the collection cassette 44 is removed at a time of the collection process, an empty collection cassette 44 is installed to the banknote handling device 2. Similarly to the first storage 41, the second storage 42, and the third storage 43, the collection cassette 44 is an example of a storage.

The banknote handling device 2 includes a transport member 45. The transport member 45 transports banknotes one by one. The transport member 45 includes a transport path that connects to a plurality of devices.

The banknote handling device 2 includes a memory 25. The memory 25 stores various information about the banknote handling device 2. The memory 25 stores, for example, the inventory amount of the banknote handling device 2. The memory 25 also stores the information about banknotes processed by the banknote handling device 2. The information about banknotes includes, for example, the serial number and the image data of a banknote obtained by the recognition circuit 24. The memory 25 is, for example, a nonvolatile semiconductor memory or a hard disk drive.

The banknote handling device 2 includes a communication unit 26. The communication unit 26 performs communication among the first operating computer 31, the second operating computer 32, and the management computer 33.

The banknote handling device 2 may include a first switch 27 and a second switch 28. As illustrated in FIG. 1, the first switch 27 and the second switch 28 are positioned on their respective sides of the upper portion of the banknote handling device 2. The first switch 27 and the second switch 28 are occupation switches. The teller at the first counter 11 operates the first switch 27 when using the banknote handling device 2. By operating the first switch 27, the teller can occupy the banknote handling device 2. The teller at the second counter 12 operates the second switch 28 when using the banknote handling device 2. By operating the second switch 28, the teller can occupy the banknote handling device 2.

The banknote handling device 2 may not include the first switch 27 and the second switch 28. In this case, when using the banknote handling device 2, the teller at the first counter 11 may occupy the banknote handling device 2 by operating the first operating computer 31 or the management computer 33. Similarly, when using the banknote handling device 2, the teller at the second counter 12 may occupy the banknote handling device 2 by operating the second operating computer 32 or the management computer 33.

Next, the operation of the banknote handling device 2 at a time of the depositing transaction and at a time of the dispensing transaction will be described with reference to FIG. 4.

(Operation at Depositing Transaction)

The upper drawing 401 of FIG. 4 illustrates operation of the banknote handling device 2 at a time of the depositing transaction. The arrows in FIG. 4 indicate a transport path of a banknote. The depositing unit 21 takes a banknote into the device. The recognition circuit 24 recognizes the banknote. The transport member 45 transports a normal banknote to the first storage 41, the second storage 42, the third storage 43, or the collection cassette 44. The first storage 41, the second storage 42, the third storage 43, or the collection cassette 44 stores the normal banknote. The transport member 45 transports a rejected banknote to the dispensing unit 22 (see the broken arrow in the upper drawing 401). At a time of the depositing transaction, the transport member 45 may transport a normal banknote to the temporary storage unit 23. The temporary storage unit 23 temporarily stores a banknote. When the teller confirms a transaction, the temporary storage unit 23 feeds out the banknote. The banknote fed out is stored in the first storage 41, the second storage 42, the third storage 43, or the collection cassette 44. When the teller cancels a transaction, the banknote fed out by the temporary storage unit 23 is transported to the dispensing unit 22.

(Operation at Dispensing Transaction)

The lower drawing 402 of FIG. 4 illustrates operation of the banknote handling device 2 at a time of the dispensing transaction. The first storage 41, the second storage 42, or the third storage 43 feeds out banknotes. The transport member 45 transports the banknote to the recognition circuit 24. The recognition circuit 24 recognizes the banknote. The transport member 45 transports a normal banknote to the dispensing unit 22. The transport member 36 transports a faulty banknote to the collection cassette 44. The collection cassette 44 stores faulty banknotes during the dispensing transaction (see the broken arrow in the lower drawing 402).

(Management of Money)

The banknote handling device 2 is used for transactions of both the bank A and the bank B. The banknotes stored in the banknote handling device 2 belong to the bank A or the bank B. The banknotes taken into the banknote handling device 2 for the depositing transaction of the bank A belong to the bank A. The banknotes taken into the banknote handling device 2 for the depositing transaction of the bank B belong to the bank B. The banknotes with which the banknote handling device 2 is replenished at a time of the replenishment process described later also belong to the bank A or the bank B.

As described above, the first storage 41, the second storage 42, and the third storage 43 of the banknote handling device 2 store banknotes by denomination. The first storage 41 stores the banknotes taken in for the depositing transaction of the bank A and the banknotes taken in for the depositing transaction of the bank B. Similarly, the second storage 42 and the third storage 43 also store the banknotes taken in for the depositing transaction of the bank A and the banknotes taken in for the depositing transaction of the bank B. The first storage 41, the second storage 42, and the third storage 43 store in a mixed manner the banknotes belonging to the bank A and the banknotes belonging to the bank B.

The management computer 33 manages the information about banknotes to be processed by the banknote handling device 2. The management computer 33 manages the banknotes to be processed by the banknote handling device 2 by distinguishing the banknotes belonging to the bank A and the banknotes belonging to the bank B.

How the management computer 33 manages banknotes in the banknote handling device 2 will be described below with reference to the drawings.

FIG. 5 illustrates an image of a database 51. The database 51 of FIG. 5 is stored in the memory 25 of the banknote handling device 2 and/or the management computer 33. The database 51 stores the information about banknotes to be processed by the banknote handling device 2. The database 51 stores the information about each individual banknote stored in each cassette or storage. The information stored about the banknote includes at least the denomination, the serial number, and the financial institution to which the banknote belongs. The information may further include image data. These items of information are the information obtained by the recognition circuit 24. Instead of storing the information about each individual banknote in each cassette or storage, the database 51 may store, in the whole of the banknote handling device 2, the information about each individual banknote stored in the banknote handling device 2.

The database 51 includes the information about the financial institutions having conducted the depositing transaction. Suppose, for example, that a banknote stored in the banknote handling device 2 is found to be a counterfeit note. In this case, the financial institution that accepted the counterfeit note is obligated to make a report to the central bank. The banknote handling device 2 shared by a plurality of financial institutions stores the information about the financial institution to which each banknote belongs to, and thus effective management of the banknotes can be performed. Even when the banknote handling device 2 shared by a plurality of financial institutions is used, which financial institution accepted the banknote at issue can be easily identified.

As the banknote handling device 2 conducts the depositing transaction or the dispensing transaction, the inventory amount changes in the first storage 41, the second storage 42, the third storage 43, and collection cassette 44. The database 51 is updated every time the inventory amount changes in the first storage 41, the second storage 42, the third storage 43, and the collection cassette 44. When the depositing transaction is conducted using the temporary storage unit 23, the database 51 is updated if the banknote is stored in the temporary storage unit 23 and the teller confirms the transaction. When the database 51 stores, in the whole of the banknote handling device 2, the information about each individual banknote stored in the banknote handling device 2, the database 51 is updated if the banknote is taken in by the banknote handling device 2 and also updated if the banknote is fed out by the banknote handling device 2.

In addition to the database 51, the management computer 33 manages the information about the inventory amount of banknotes in each of the first storage 41, the second storage 42, the third storage 43, and the collection cassette 44, by distinguishing the inventory amount of the bank A and the inventory amount of the bank B. The information about the inventory amount of banknotes may be managed in terms of the number of banknotes or the face value of banknotes, with the inventory amount of the bank A and the inventory amount of the bank B being distinguished from each other. Further, the information about the inventory amount of banknotes may be managed using a ratio between the inventory amount of the bank A to the inventory amount of the bank B.

The upper table 601 of FIG. 6 illustrates the information about the inventory amount of banknotes, where the information is managed by the management computer 33. This information shows that the first storage 41 stores 420 banknotes of 5 Euro for the bank A and 80 banknotes of 5 Euro for the bank B. Similarly, the second storage 42 stores 150 banknotes of 10 Euro for the bank A and 150 banknotes of 10 Euro for the bank B, and the third storage 43 stores 250 banknotes of 20 Euro for the bank A and 450 banknotes of 20 Euro for the bank B. Further, the collection cassette 44 stores 20 banknotes of 5 Euro for the bank A, 80 banknotes of 5 Euro for the bank B, 50 banknotes of 10 Euro for the bank A, 50 banknotes of 10 Euro for the bank B, 80 banknotes of 20 Euro for the bank A, 20 banknotes of 20 Euro for the bank B, 150 banknotes of 50 Euro for the bank A, and 250 banknotes of 50 Euro for the bank B.

In FIG. 6, the information managed by the management computer 33 includes the number of banknotes of a single denomination or multiple denominations stored in a single storage. For example, the contents in the upper table 601 correspond to the information managed by the management computer 33. Regarding the banknotes of which the denomination is EUR 5 in the first storage 41, the number of banknotes belonging to the bank A and the number of banknotes belonging to the bank B are 420 and 80, respectively. Further, the sum of the number of banknotes belonging to the bank A and the number of banknotes belonging to the bank B is 500 (=420+80), which indicates the number of actual banknotes of EUR 5 stored in the first storage 41. The same applies to the second storage 42, the third storage 43, and the collection cassette 44, and also the same applies to subsequent FIGS. 7 to 11.

(Deposit Transaction)

Here, suppose that the banknote handling device 2 is used to conduct a depositing transaction of the bank A. The depositing transaction is to deposit 20 banknotes of 5 Euro and 10 banknotes of 10 Euro. For this depositing transaction, 18 banknotes of 5 Euro are stored in the first storage 41; 2 banknotes of 5 Euro are stored in the collection cassette 44 because they are unfit notes; and 10 banknotes of 10 Euro are stored in the second storage 42. The management computer 33 updates the inventory amount of the bank A as illustrated in the lower table 602 of FIG. 6. The inventory amount of the bank A in the first storage 41 is updated from 420 to 438. The inventory amount of the bank A in the second storage 42 is updated from 150 to 160. The inventory amount of banknotes of 5 Euro for the bank A in the collection cassette 44 is updated from 20 to 22. For the depositing transaction of the bank A, the database 51 is also updated. The inventory amount of the bank B is not updated. In other words, since the management computer 33 manages, as the banknotes belonging to the bank A, 20 banknotes of 5 Euro and 10 banknotes of 10 Euro for the above depositing transaction, those banknotes for the depositing transaction are managed on data separately from the banknotes of 5 Euro and 10 Euro stored in the same banknote handling device 2 and belonging to the bank B.

(Dispensing Transaction)

Next, suppose that the banknote handling device 2 is used to conduct a dispensing transaction of the bank B. The dispensing transaction is to dispense 100 banknotes of 5 Euro. The upper table 701 of FIG. 7 is the same as the lower table 602 of FIG. 6. As shown in the upper table 701 of FIG. 7, the inventory amount of the bank B in the first storage 41 is 80, and the inventory amount of the bank B alone is insufficient for dispensing. However, the first storage 41 stores 518 banknotes of 5 Euro in total, and thus the banknote handling device 2 can dispense 100 banknotes of 5 Euro to the outside of the device. The banknote handling device 2 completes the dispensing transaction of the bank B by dispensing 100 banknotes of 5 Euro fed out from the first storage 41 to the outside of the device. The management computer 33 updates the inventory amount of the bank B in the first storage 41.

Here, the example of FIG. 7 assumes that one of the banknotes of 5 Euro fed out from the first storage 41 is regarded as a rejected banknote and that the rejected banknote is stored in the collection cassette 44. In the dispensing transaction of the bank B, 101 banknotes of 5 Euro are fed out from the first storage 41. As shown in the lower table 702 of FIG. 7, the inventory amount of the bank B in the first storage 41 is updated from 80 to −21. The inventory amount of banknotes of 5 Euro for the bank B in the collection cassette 44 is updated from 80 to 81. The actual number of banknotes of 5 Euro stored in the first storage 41 is 417, the sum of the inventory amount of the bank A (+438) and the inventory amount of the bank B (−21). The inventory amount of the bank A is not updated.

When the banknote handling device 2 performs the transaction process for the bank A, the management computer 33 updates the information about banknotes of the bank A as shown in FIG. 6, and when the banknote handling device 2 performs the transaction process for the bank B, the management computer 33 updates the information about banknotes of the bank B as shown in FIG. 7. The management computer 33 can effectively manage the banknotes stored in the banknote handling device 2 used by both the bank A and the bank B.

(Collection Process)

If the inventory amount of the banknote handling device 2 increases, the banknotes stored in the banknote handling device 2 are collected. The CIT having received a request from the bank A and/or the bank B performs the collection process of the banknote handling device 2. An operator of the bank A or an operator of the bank B sends a request for the collection process to the CIT server 35 through the management computer 33.

The full number of banknotes or the full amount of money in each of the storage 41, the storage 42, the storage 43, and the collection cassette 44 of the banknote handling device 2 is determined by the sum of the inventory amount of the bank A and the inventory amount of the bank B.

An operator of the CIT operates the banknote handling device 2 or operates the management computer 33 in the building 10 in order to perform the collection process of the banknote handling device 2.

The upper table 801 of FIG. 8 shows the inventory amount of the banknote handling device 2 before the collection process, and the lower table 802 of FIG. 8 shows the inventory amount of the banknote handling device 2 after the collection process. The upper table 801 of FIG. 8 is the same as the lower table 702 of FIG. 7. The banknote handling device 2 performs both the collection process of banknotes belonging to the bank A and the collection process of banknotes belonging to the bank B together. The collection process for the bank A and the collection process for the bank B being performed together reduces the number of collection requests sent to the CIT. The bank A and the bank B can reduce their costs for the collection process.

In the collection process, the operator of the CIT may collect the banknotes stored in the collection cassette 44 by removing the collection cassette 44 from the banknote handling device 2. The operator of the bank A and the operator of the bank B may transfer the banknotes to be collected from the first storage 41, the second storage 42, or the third storage 43 to the collection cassette 44 so that the banknotes to be collected are stored in advance in the collection cassette 44. The banknotes may be transferred by operation of the first operating computer 31, the second operating computer 32, or the management computer 33. Instead of the collection cassette 44 being removed, the collection cassette 44 may feed out the banknotes so that the transport member 45 can transport the fed-out banknotes to the dispensing unit 22.

If the collection process is executed, the inventory amount of the bank A and the inventory amount of the bank B in the collection cassette 44 all become zero as shown in the lower table 802 of FIG. 8.

In the collection process, the banknotes stored in the first storage 41, the second storage 42, or the third storage 43 may be collected. The operator of the bank A and the operator of the bank B can set in advance the number of banknotes to be collected, through, for example, the management computer 33. In the example of FIG. 8, 38 banknotes of 5 Euro for the bank A stored in the first storage 41 and 150 banknotes of 20 Euro for the bank B stored in the third storage 43 are dispensed from the dispensing unit 22 to the outside of the banknote handling device 2. Similarly to the dispensing transaction, the transport member 45 transports the banknotes to be collected from the first storage 41, the second storage 42, or the third storage 43 to the dispensing unit 22 (see the lower drawing 402 of FIG. 4).

After the collection process, the management computer 33 updates the inventory amount of the bank A and the inventory amount of the bank B in the first storage 41, the second storage 42, the third storage 43, and the collection cassette 44.

The management computer 33 also calculates the cost for the collection process based on the information about the denomination and number of banknotes to be collected for the bank A and the information about the denomination and number of banknotes to be collected for the bank B. This is because the cost for the collection process of the CIT might be determined by the amount of banknotes transported by the CIT. For the collection process, the bank A and the bank B may share the cost according to their respective amounts of money collected. The request information accompanied with a request which the operator of the bank A or the operator of the bank B sends for the collection process to the CIT server 35 through the management computer 33 may include the information about the cost that each bank has to pay for the collection or the information about the ratio of the cost that each bank has to pay for the collection. The cost that each bank has to pay for the collection or the ratio of the cost that each bank has to pay for the collection is based on the number of banknotes to be collected for each bank.

Instead of being performed by the CIT, the collection process may be performed by the operator of the bank A or the operator of the bank B in the building 10. In this case, the banknotes collected from the banknote handling device 2 may be stored in a safe in the building 10 (i.e., in-store operation).

In the collection process operated in a store, the banknotes collected through the collection cassette 44 are sorted into banknotes for the bank A and banknotes for the bank B. The counting function of the banknote handling device 2 can be used for sorting the banknotes. The counting function is a function of recognizing, through the recognition circuit 24, the banknotes inserted into the depositing unit 21 and dispensing the recognized banknotes to the dispensing unit 22. Before sorting is carried out, the banknote handling device 2 is assigned to the bank A or the bank B. The banknotes taken out from the collection cassette 44 are inserted into the depositing unit 21. Based on the inventory amount of the bank A or the inventory amount of bank B for each denomination in the collection cassette 44 before the collection process, the banknote handling device 2 transports the banknotes so that the banknotes whose the number corresponds to the inventory amount of the designated bank is dispensed to the dispensing unit 22. Here, the collection cassette 44 stores banknotes of a plurality of denominations, whereas the banknote handling device 2 has only one dispensing unit 22. The banknote handling device 2 sorts banknotes denomination by denomination. Among the banknotes having passed through the recognition circuit 24, the banknotes of the target denomination are dispensed to the dispensing unit 22, and the banknotes of the non-target denominations are temporarily stored in, for example, the temporary storage unit 23. If the banknote handling device 2 has two or more dispensing units, the banknote handling device 2 may use the two or more dispensing units to sort the banknotes.

(Replenishment Process)

If the inventory amount of the banknote handling device 2 decreases, the banknote handling device 2 is replenished with banknotes. The CIT having received a request from the bank A and/or the bank B performs the replenishment process of the banknote handling device 2. The operator of the bank A or the operator of the bank B sends a request for the replenishment process to the CIT server 35 through the management computer 33.

Additionally, the inventory amount in each of the storage 41, the storage 42, the storage 43, or the collection cassette 44 of the banknote handling device 2 is determined by the sum of the inventory amount of the bank A and the inventory amount of the bank B.

The upper table 901 of FIG. 9 shows the inventory amount of the banknote handling device 2 before the replenishment process, and the lower table 902 of FIG. 9 shows the inventory amount of the banknote handling device 2 after the replenishment process. The upper table 901 of FIG. 9 is the same as the lower table 802 of FIG. 8. The banknote handling device 2 performs both the replenishment process of banknotes belonging to the bank A and the replenishment process of banknotes belonging to the bank B together. The replenishment process for the bank A and the replenishment process for the bank B being performed together reduces the number of replenishment requests sent to the CIT. The bank A and the bank B can reduce their costs for the replenishment process.

In the replenishment process, the operator of the CIT inserts banknotes for replenishment into the depositing unit 21. The operator of the CIT also enters the number of banknotes for replenishment for each bank into the management computer 33. The operator of the CIT may enter the inventory amount of the bank A and the inventory amount of the bank B in each of the first storage 41, the second storage 42, and the third storage 43, where each inventory amount is an inventory amount desired after the replenishment process. The banknote handling device 2 performs the replenishment process to achieve the entered inventory amount of the bank A and the entered inventory amount of the bank B.

In the replenishment process, similarly to the depositing transaction, the transport member 45 transports the banknotes from the depositing unit 21 to the first storage 41, the second storage 42, or the third storage 43 through the recognition circuit 24. The first storage 41, the second storage 42, or the third storage 43 stores the banknotes (see the upper drawing 401 of FIG. 4). In the example of FIG. 9, the first storage 41 stores 321 banknotes of 5 Euro as banknotes of the bank B, and the second storage 42 stores 90 banknotes of 10 Euro as banknotes the bank A and 150 banknotes of 10 Euro as banknotes belonging to the bank B. The management computer 33 updates the inventory amount of the bank A and the inventory amount of the bank B in the first storage 41, the second storage 42, and the third storage 43. Here, the inventory amount of the bank B in the first storage 41 before the replenishment process is −21. By the first storage 41 being replenished with 321 banknotes of 5 Euro, the inventory amount of the bank B in the first storage 41 after the replenishment process is 300. Further, the inventory amount of the bank A in the second storage 42 is updated from 160 to 250, and the inventory amount of the bank B in the second storage 42 is updated from 150 to 300.

The management computer 33 also calculates the cost for the replenishment process based on the information about the denomination and number of banknotes for replenishment for the bank A and the denomination and number of banknotes for replenishment for the bank B. For the replenishment process, the bank A and the bank B may share the cost according to their respective amounts of money for replenishment. The request information accompanied with a request which the operator of the bank A or the operator of the bank B sends for the replenishment process to the CIT server 35 through the management computer 33 may include the information about the cost that each bank has to pay for the replenishment or the information about the ratio of the cost that each bank has to pay for the replenishment. The cost that each bank has to pay for the replenishment or the ratio of the cost that each bank has to pay for the replenishment is based on the number of banknotes for replenishment for each bank.

The replenishment process may be performed in a store. In other words, the operator of the bank A or the operator of the bank B may separately perform the replenishment process. In this case, the operator of the bank A may perform the replenishment process through the first operating computer 31, and the operator of the bank B may perform the replenishment process through the second operating computer 32. The management computer 33 can determine whether the banknotes for replenishment belong to the bank A or belong to the bank B based on the operating computer having output a command to perform the replenishment process.

(Replenishment and Collection Process)

The collection process and the replenishment process can be performed together. In other words, the banknotes are collected from the storage so that the inventory amount in the storage after the replenishment process matches a designated inventory amount. By performing the collection process and the replenishment process together, the number of banknotes transported by the CIT is reduced, and thus the costs for the collection process and the replenishment process can be further reduced.

The upper table 1001 of FIG. 10 shows the inventory amount of the banknote handling device 2 before the replenishment and collection process, and the lower table 1002 of FIG. 10 shows the inventory amount of the banknote handling device 2 after the replenishment and collection process. The upper table 1001 of FIG. 10 is the same as the upper table 801 of FIG. 8, and the lower table 1002 of FIG. 10 is the same as the lower table 902 of FIG. 9.

The collection of the collection cassette 44 in the replenishment and collection process is the same as the collection process described above. The collection of the first storage 41, the second storage 42, or the third storage 43 is different from the collection process described above. As shown in the upper table 1001 of FIG. 10, the inventory amount of the bank A in the first storage 41 is +438 and the inventory amount of the bank B is −21. Thus, the first storage 41 actually stores 417 banknotes of 5 Euro. After the replenishment process, the inventory amount of the bank A in the first storage 41 is +400, and the inventory amount of the bank B in the first storage 41 is +300. After the replenishment process, the first storage 41 should store 700 banknotes of 5 Euro. Thus, in the replenishment and collection process, the first storage 41 is replenished with 283 banknotes of 5 Euro. Then, recognizing that 38 banknotes of 5 Euro for the bank A are collected from the first storage 41 and that the first storage 41 is replenished with 321 banknotes of 5 Euro for the bank B, the management computer 33 updates the inventory amount of banknotes of 5 Euro of the bank A to 400 and the inventory amount of banknotes of 5 Euro of the bank B to 300. The CIT can omit transporting 38 banknotes of 5 Euro collected from the first storage 41.

The replenishment for the second storage 42 is the same as in FIG. 9, and the collection from the third storage 43 is the same as in FIG. 8.

The replenishment and collection process is expected to reduce the cost also because the process with improved efficiency can shorten the operation time of the CIT at the building 10.

As described above, in the replenishment and collection process, the money handling device feeds out the money stored or takes the money in so that the money stored in the money handling device after a replenishment matches the sum of the inventory amount of the first financial institution after the replenishment and the inventory amount of the second financial institution after the replenishment. Then, after the replenishment and collection process, the computer updates the information about the money of the first financial institution and the information about the money of the second financial institution.

The replenishment and collection process might be equivalent to the collection process and/or the replenishment process even if the money handling device does not actually feed the money out or take the money in. The replenishment and collection process is expected to reduce the cost also because the process with improved efficiency can shorten the operation time of the CIT at the building 10.

(Money Change Process)

As described above, even if the inventory amount of one of the banks is negative, the banknote handling device 2 can continue the dispensing transaction as long as the banknote handling device 2 stores banknotes. The negative inventory amount can be settled by replenishment of the banknotes of a desired denomination.

Differently from this, for the banknotes stored in the banknote handling device 2, the management computer 33 may execute settlement of a negative inventory amount through a money change process among multiple banks. In the money change process, the denominations are exchanged without changing the amount (face value) of one of the banks and the amount (face value) of the other one of the banks. For example, a process that includes transferring 10 banknotes of 5 Euro from the bank A to the bank B and transferring 5 banknotes of 10 Euro from the bank B to the bank A is an equivalent exchange, or a money change process.

The upper table 1101 of FIG. 11 shows the inventory amount of the bank A and the inventory amount of the bank B before the money change process, and the lower table 1102 shows the inventory amount of the bank A and the inventory amount of the bank B after the money change process. The upper table 1101 of FIG. 11 is the same as the lower table 702 of FIG. 7. The inventory amount of banknotes of 5 Euro for the bank B in the first storage 41 is −21.

As an example, the money change process using banknotes of 20 Euro for the bank B and banknotes of 5 Euro for the bank A will be described. Here, the example using a first storage (EUR 5), a second storage (EUR 10), and a collection cassette (EUR 5) will be described. In the example of FIG. 11, the management computer 33 reduces the inventory amount of banknotes of 20 Euro for the bank B in the third storage 43 from 450 to 400 (i.e., reduction by 50 banknotes), and increases the inventory amount of banknotes of 20 Euro for the bank A in the third storage 43 from 250 to 300 (i.e., increase by 50 banknotes). The number of banknotes of 20 Euro stored in the third storage 43 remains the same before and after the money change process.

The management computer 33 also increases the inventory amount of banknotes of 5 Euro for the bank B in the first storage 43 by 238 banknotes, and reduces the inventory amount of banknotes of 5 Euro for the bank A in the first storage 41 by 238 banknotes. The number of banknotes of 5 Euro stored in the first storage remains the same before and after the money change process.

Further, in the example of FIG. 11, the management computer 33 reduces the inventory amount of banknotes of 5 Euro for the bank B stored in the collection cassette 44 by 38 banknotes, and increases the inventory amount of banknotes of 5 Euro for the bank B stored in the first storage 41 by 38 banknotes. Accordingly, the inventory amount of banknotes of 5 Euro for the bank A stored in the collection cassette 44 increases by 38 banknotes, and the inventory amount of banknotes of 5 Euro for the bank A stored in the first storage 41 decreases by 38 banknotes. The number of banknotes of 5 Euro stored in the collection cassette (EUR 5) remains the same before and after the money change process. Thus, the inventory amount of banknotes of 5 Euro for the bank B stored in the first storage 41 increases from −21 to +217, and the inventory amount of banknotes of 5 Euro for the bank A stored in the first storage 41 decreases from 438 to 200. The number of banknotes of 5 Euro stored in the first storage 41 remains the same before and after the money change process. Similarly, the number of banknotes stored in the collection cassette 44 remains the same before and after the money change process. Consequently, in this money change process, (5 Euro)×(238 banknotes)=1190 is transferred from the bank A to the bank B, and the total 1190 Euro, which is the sum of (20 Euro)×(50 banknotes)=1000 Euro and (5 Euro)+(38 banknotes)=190 Euro, is transferred from the bank B to the bank A.

As described above, in the money change process, the money handling device including the first storage and the second storage does not transfer money between the first storage and the second storage. In the money change process, in response to changing at least part of the money belonging to the first financial institution to the money belonging to the second financial institution among the money stored in the first storage, the computer changes at least part of the money belonging to the second financial institution to the money belonging to the first financial institution among the money stored in the second storage.

Execution of the money change process leads to reduction in the frequency of the banknote replenishment processes. The cost for the replenishment process of the CIT can be reduced.

(Other Control of Banknote Handling Device)

In some cases, the banknote is jammed in the transport path or the entrance of the storage while the banknote handling device 2 is performing the depositing transaction or the dispensing transaction. If the banknote is jammed, the banknote handling device 2 stops due to an error. If an operator removes the jammed banknote from the banknote handling device 2 in order to clear the error, the computer outputs the information about the denomination, the serial number, the image, and the financial institution of the banknote related to the error. The computer may be any of the management computer 33, the first operating computer 31, and the second operating computer 32. The operator resolves the error based on the output information obtained from the computer. Based on the output information, the operator can effectively determine, for example, whether the banknote related to the error has been already stored in the first storage 41, the second storage 42, or the third storage 43. The management computer 33 can effectively manage the banknotes stored in the banknote handling device 2.

The money handling system 1 is not limited to the configuration shown in FIG. 1. The money handling system 100 may be configured as illustrated in FIG. 12, for example. In the money handling system 100, each of the first operating computer 31 and the second operating computer 32 is connected to the banknote handling device 2 via the management computer 33. If the first operating computer 31 or the second operating computer 32 is operated, the banknote handling device 2 performs a process for the banknotes in association with a transaction of the bank A or the bank B. As described above, the management computer 33 may manage the database 51 and the inventory amount of each bank.

The management computer 33 may be incorporated in the banknote handling device 2. The first operating computer 31 and/or the second operating computer 32 may have the functions of the management computer 33. The first operating computer 31 having the functions of the management computer 33 may be connected to the banknote handling device 2, whereas the second operating computer may be connected to the banknote handling device 2 via the first operating computer.

The banknote handling device 2 is not limited to being shared by two financial institutions, and may be shared by three or more financial institutions. The money handling system 1 may further include a third operating computer. The third operating computer outputs, to the banknote handling device 2, execution of the third money handling process related to transactions of the third financial institution.

The money handling system 1 may include a plurality of money handling devices. Each of the plurality of financial institutions can use a plurality of money handling devices. The plurality of money handling devices and the management computer performs the control described above.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A money handling system, comprising:

a money handling device installed in a property accommodating a first financial institution and a second financial institution, wherein the money handling device is configured to perform a money handling process involving taking money in or feeding out money stored, the money handling process includes a first money handling process for a transaction of the first financial institution and a second money handling process for a transaction of the second financial institution, and the money handling device includes a first storage configured to store money of a first denomination for the first financial institution and money of the first denomination for the second financial institution, which are transported through a conveyor; and a computer configured to manage information about the money processed by the money handling device;

distinguish, as the management, between money belonging to the first financial institution and money belonging to the second financial institution;

update the information about the money of the first financial institution in a case where the money handling device performs the first money handling process;

update the information about the money of the second financial institution in a case where the money handling device performs the second money handling process;

electronically manage, in a database, a number N1, for each denomination, of pieces of money stored in the first storage and belonging to the first financial institution, and a number N2, for each denomination, of pieces of money stored in the first storage and belonging to the second financial institution;

in a case that one or more pieces of money that are n pieces more than the number N1 of pieces of money stored in the first storage and belonging to the first financial institution are dispensed:

manage in the database, without changing the number N2 of pieces of money belonging to the second financial institution so as not to adversely affect the second financial institution, the number of pieces of money belonging to the first financial institution as −n; and based on transmission, to an outside computer that is outside the system, of a request to perform a replenishment process for replenishing money to the money handling device after the dispensing of N1+n pieces of money, wherein a first replenishment process for money of the first financial institution and a second replenishment process for money of the second financial institution are collectively performed in the replenishment process:

electronically record in the database, (i) replenishment of X+n pieces of money of the first financial institution to be stored in the first storage, where X is a target number of pieces of money to be replenished, and (ii) replenishment of X pieces of money of the second financial institution to be stored in the first storage, where X is a target number of pieces of money to be replenished, wherein in the replenishment process, the money handling device is configured to transport the pieces of money belonging to the first financial institution and the pieces of money belonging to the second financial institution through the conveyor to the first storage.

2. The money handling system of claim 1, wherein the money handling device includes a second storage storing banknotes or coins of a second denomination for the first financial institution and banknotes or coins of the second denomination for the second financial institution, and the computer is configured to manage the number of banknotes or coins of each denomination stored in the first storage and the second storage, the banknotes or the coins belonging to the first financial institution and the number of banknotes or coins of each denomination stored in the first storage and the second storage, the banknotes or the coins belonging to the second financial institution.

3. The money handling system of claim 1, further comprising:

a first operating computer configured to output execution of the first money handling process to the money handling device; and a second operating computer configured to output execution of the second money handling process to the money handling device, wherein the computer is configured to update the information about the money of the first financial institution in a case where the money handling device performs the money handling process based on the output of the first operating computer, and update the information about the money of the second financial institution in a case where the money handling device performs the money handling process based on the output of the second operating computer.

4. The money handling system of claim 3, wherein at least one of the first operating computer or the second operating computer is a tablet computer.

5. The money handling system of claim 1, wherein the money handling device is configured to perform a collection process of collecting the money stored from the money handling device, and in the collection process, a first collection process of the money of the first financial institution and a second collection process of the money of the second financial institution are performed together.

6. The money handling system of claim 5, wherein the computer is configured to send a request to perform the collection process including the first collection process and the second collection process to the outside computer which is outside the system.

7. The money handling system of claim 6, wherein the computer is configured to calculate a cost for the collection process based on information about the denomination and number of banknotes or coins to be collected, the banknotes or the coins belonging to the first financial institution and information about the denomination and numbers of banknotes or coins to be collected, the banknotes or the coins belonging to the second financial institution.

8. The money handling system of claim 1, wherein the computer is configured to calculate a cost for the replenishment process based on information about the denomination and number of banknotes or coins for replenishment of the first financial institution and information about the denomination and number of banknotes or coins for replenishment of the second financial institution.

9. The money handling system of claim 5, wherein the computer is configured to send a request to perform the collection process including the first collection process and the second collection process and the replenishment process including the first replenishment process and the second replenishment process to the computer which is outside the system.

10. The money handling system of claim 1, wherein the money handling device includes a sensor for obtaining information about a denomination of money.

11. The money handling system of claim 1, wherein the money handling device is configured to perform a process for banknotes, and the money handling device includes a sensor for obtaining identification information about banknotes.

12. The money handling system of claim 11, wherein in a case that an error occurs during a process by the money handling device, the computer is configured to output information about a denomination, an identification number, and a financial institution of a banknote related to the error.

13. The money handling system of claim 1, wherein the computer is a tablet computer.

14. The money handling system of claim 3, wherein the money handling device is further configured to perform a third money handling process related to a transaction of a third financial institution being accommodated in the property, the money handling system further includes a third operating computer configured to output execution of the third money handling process to the money handling device, and the computer is configured to update information about money of the third financial institution if the money handling device performs the money handling process based on the output of the third operating computer.

15. The money handling system of claim 1, further comprising:

a second money handling device configured to perform the first money handling process and the second money handling process.

16. A money handling system, comprising:

a money handling device including a first storage and a computer, wherein the money handling device is installed in a property accommodating a first financial institution and a second financial institution, the money handling device is configured to perform a money handling process involving taking money in or feeding out money stored, the money handling process includes a first money handling process for a transaction of the first financial institution and a second money handling process for a transaction of the second financial institution, the first storage is configured to store money of a first denomination for the first financial institution and money of the first denomination for the second financial institution, which are transported through a conveyor, the computer configured to:

manage information about the money processed by the money handling device;

distinguish, as the management, between money belonging to the first financial institution and money belonging to the second financial institution;

update the information about the money of the first financial institution in a case that the money handling device performs the first money handling process;

update the information about the money of the second financial institution in a case that the money handling device performs the second money handling process;

electronically manage, in a database, a number N1, for each denomination, of pieces of money stored in the first storage and belonging to the first financial institution, and a number N2, for each denomination, of pieces of money stored in the first storage and belonging to the second financial institution;

in a case that one or more pieces of money that are n pieces more than the number N1 of pieces of money stored in the first storage and belonging to the first financial institution are dispensed:

manage in the database, without changing the number N2 of pieces of money belonging to the second financial institution so as not to affect the second financial institution, the number of pieces of money belonging to the first financial institution as −n; and based on transmission, to an outside computer that is outside the system, of a request to perform a replenishment process for replenishing money to the money handling device after the dispensing of N1+n pieces of money, wherein a first replenishment process for money of the first financial institution and a second replenishment process for money of the second financial institution are collectively performed in the replenishment process:

electronically record in the database, (i) replenishment of X+n pieces of money of the first financial institution to be stored in the first storage, where X is a target number of pieces of money to be replenished, and (ii) replenishment of X pieces of money of the second financial institution to be stored in the first storage, where X is a target number of pieces of money to be replenished, and in the replenishment process, the money handling device is configured to transport the pieces of money belonging to the first financial institution and the pieces of money belonging to the second financial institution through the conveyor to the first storage.

* * * * *